Patented Mar. 5, 1946

2,395,894

UNITED STATES PATENT OFFICE 2,395,894

COATING MATERIAL FOR LINING CANS

William F. May, Maywood, Ill., assignor to American Can Company, New York, N. Y., a corporation of New Jersey No Drawing. Application March 19, 1942,
Serial No. 435,426

2 Claims. (Cl. 260—30)

The present invention relates to a coating material of the heat reactive phenolic lacquer type which may be used in sheet metal containers for the packing of fish, meats, and other products high in essential oils or products having corrosive liquid contents, and has particular reference to a vinyl resin modified heat reactive phenolic resin coating material which may be applied to a body blank or to a can body and which may be dried thoroughly after its application to the can body surface by a temperature bake as low as 300 degrees F., thus adapting it to interior coating of formed and side seam soldered can bodies as well as to the usual flat coating of sheets or blanks used in can manufacture.

Metal cans which are used for containing foods are made usually from tin plate which provides a tin coated surface on both the outside and the inside of the can. In manufacturing the can body its side seam is formed usually with lock and lap sections which subsequently are soldered. In the bending of the metal incident to the side seam forming operation the tin surface on the inside of the can often is cracked or otherwise damaged adjacent the seam area. With such a damaged surface certain food products, particularly those high in essential oils and those having corrosive liquid constituents, react with areas of the metal base exposed by the disturbed tin lining.

At the present time tin is scarce and resort is being had more and more to sheet metal cans which are not coated with tin, such as black iron cans. The coating material of the present invention is also adaptable to these cans and provides a sufficient covering in a single coat for the interior of cans made from such uncoated metals, for fish and meat products including those of a more pronounced acidic nature, such as clam chowder.

Numerous heat reactive phenolic type lacquers have been formulated for a lining in metallic containers and such are extremely chemically and water resistant. Invariably these linings are brittle, however, due to the fact that any plasticization through the use of oils or the usual plasticizers reduces their chemical resistance. In addition to the difficulties encountered in fabricating these containers due to such inherent brittleness of the enamel film, it is found that an off-taste is imparted to the food products packed in such lined containers. As far as is known, the container manufacturing industry has never possessed a lacquer which embodied the film of lining enamel, properties of a heat reactive phenolic resin and the flexibility and taste free characteristics of a high bake oleoresinous material for use as a lining coat.

The present invention contemplates the provision of an improved single coating for the interior of cans which possesses great flexibility, is not damaged by baking temperatures approximating 300 degrees F. to 400 degrees F., has chemical and water resistant qualities and does not impart off taste to food products packed in the cans. Such a coating may be applied to the can body blank since it is sufficiently flexible for subsequent body forming operations or it may be applied to a formed can body by spraying or otherwise, inasmuch as such a coating after application may be baked completely to eliminate all solvents and all taste imparting substances by a baking temperature of about 300 degrees F. Such a relatively low baking temperature will not soften or otherwise adversely affect the solder or other bonding medium used in the side seam of the can body.

An object of the present invention is the provision of a coating material formed of a novel combination of certain heat reactive phenolic type lacquers with a polyvinyl aldehyde as a modifying or plasticizing agent, the resulting substance producing a flexible, taste-free, chemical and moisture resistant coating for lining a sheet metal can body surface and which after application may if neccesary be baked at a temperature safe for the bonded side seam of the can body.

Numerous other objects and advantages of the invention will be apparent as it is better understood from the following description which is of a preferred embodiment thereof.

The coating material formula hereinafter given as an example of a preferred embodiment of the present invention shows, in a phenolic lacquer lining or coating for a can surface, the use of a polyvinyl aldehyde resin as a modifying or plasticizing agent and the product obtained possesses greatly improved characteristics. In addition to the two ingredients mentioned the lining material when finally prepared for use also contains certain thinners or solvents which give the desired consistency for the desired application to the surface to be coated.

A heat reactive or heat convertible or thermosetting phenolic resin suitable for the purpose may be a toluol soluble type or an alcohol soluble type. These types are unmodified phenolaldehyde resins. One exemplary toluol soluble resin of this unmodified heat reactive or heat convertible or thermosetting type which meets the requirements is sold under the trade name of Bakelite XV14444." Another alcohol soluble example of an unmodified heat reactive or heat convertible or thermo setting phenol aldehyde resin is sold under the trade name of "Durez 175."

Suitable modifying or plasticizing agents according to the present invention are polyvinyl acetal resins also called by some authorities polyvinylal resins. Such polyvinylal resins have been partially or wholly converted by the interaction of polyvinyl alcohol or polyvinyl esters and aliphatic aldehydes of from one to four carbon atoms in length, which is the range from formaldehyde to butyraldehyde. These are usually referred to as polyvinyl formals, polyvinyl butyrals and polyvinyl acetals.

Satisfactory resins of this type are sold under the trade name of "Formvar." The polyvinyl formal type resin is used preferably for modifying the "Bakelite XV14444" type resin. Another polyvinylacetal type resin which was found to be suitable is sold under the trade name of "Vinylite XYSG," which is a polyvinyl butyral resin and may be used as a suitable modifying agent for "Durez 175."

The plasticizing or modifying of the phenolic lacquer is accomplished by mixing the modifying agent with the lacquer and allowing the mixture to stand at a suitable temperature for a length of time sufficient for complete solubility.

For example, in modifying the "Bakelite XV14444" with the "Formvar" resin, for each one hundred pounds of "Bakelite" resin solids, fifteen pounds of the "Formvar" resin may be used. These two materials are combined in a convenient manner, as by putting them in a mixing kettle where provision is made for maintaining a temperature of about 120 degrees F. At this temperature complete solubility should be obtained in forty-eight hours.

The viscous mixture which results from this combining of these materials is not satisfactory for application to the can surface to be coated as it is entirely too thick. A lowering of viscosity therefore is necessary to condition the mixture for use in commercial coaters. Accordingly suitable solvents or thinners are used to obtain a compatible homogeneous mixture suitable for lining a can wall.

For this purpose a mixture of three different thinners has been found to provide for proper volatility and solvent power and these are mentioned as examples at this time. By way of example, this three part thinner is made by mixing together seventy percent of Toluol, twenty percent of Acetone and ten percent of Hexone (methyl isobutyl retone). By adding quantities of this thinner to the lacquer resin mixture above described, a viscosity may be obtained in the final coating material to permit its application to the can surface in the manner desired, as by spraying, brushing, coating, etc.

Similar proportions of the "Durez" alcohol soluble phenolic lacquer and the vinyl resin can be combined in the same manner and at the same time, temperature, etc., to produce a viscous mixture which then can be thinned for use as described.

After the lining material has been applied to the can surface whether in the flat or after the can body has been formed, all of the solvents can be eliminated by a baking temperature of 300 degrees F. for about ten minutes. In the case of the coating having been applied to the body blank or to a sheet, this baking temperature can be increased to possibly 350 degrees F. or 400 degrees F. without causing the applied coating to blush or become detached from the can surface. In the event of the baking of a formed can body with a soldered side seam, this baking temperature will be maintained preferably at about 300 degrees F. At this temperature the soldered side seam will not be softened.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

1. A tastefree, flexible coating composition for sheet metal containers which has high chemical and water resistant properties, comprising in combination, a phenol aldehyde resin which is heat convertible, plasticized and modified by a polyvinyl acetal resin of an aliphatic aldehyde having the formula R. CHO, R being selected from the group consisting of hydrogen and alkyl radicals having from one to three carbon atoms, said phenol aldehyde resin being present in proportions of one-hundred pounds by weight and said polyvinyl acetal resin in proportions of fifteen pounds by weight, said composition brought to proper coating viscosity by a compatible solvent mixture of seventy percent of a liquid aromatic hydrocarbon, the remainder being a ketone.

2. A tastefree, flexible coating composition for sheet metal containers which has high chemical and water resistant properties, comprising in combination, a phenol aldehyde resin which is heat convertible, plasticized and modified by a polyvinyl acetal resin of an aliphatic aldehyde having the formula R. CHO, R being selected from the group consisting of hydrogen and alkyl radicals having from one to three carbon atoms, said phenol aldehyde resin being present in proportions of one-hundred pounds by weight and said polyvinyl acetal resin in proportions of fifteen pounds by weight, said composition brought to proper coating viscosity by a compatible solvent mixture of seventy percent of toluol, twenty percent of acetone and ten percent of methyl isobutyl ketone.

WILLIAM F. MAY.